United States Patent
Adler et al.

(10) Patent No.: US 6,588,230 B1
(45) Date of Patent: Jul. 8, 2003

(54) SEALED, NOZZLE-MIX BURNERS FOR SILICA DEPOSITION

(75) Inventors: Meryle D. M. Adler, Corning, NY (US); John T. Brown, Corning, NY (US); Mahendra K. Misra, Horseheads, NY (US)

(73) Assignee: Corning Incorporated, Corning, NY (US)

(*) Notice: Subject to any disclaimer, the term of this patent is extended or adjusted under 35 U.S.C. 154(b) by 0 days.

(21) Appl. No.: 09/364,149

(22) Filed: Jul. 30, 1999

Related U.S. Application Data
(60) Provisional application No. 60/095,741, filed on Aug. 7, 1998.

(51) Int. Cl.$^7$ .......................... C03B 19/01; C03B 19/09
(52) U.S. Cl. .......................... 65/17.3; 65/413; 65/531; 239/416; 239/416.1; 239/416.4; 239/533.2; 423/337
(58) Field of Search .................. 65/531, 413, 17.3; 239/533.2, 416.1, 416.4, 416; 423/337

(56) References Cited

U.S. PATENT DOCUMENTS

| | | | | |
|---|---|---|---|---|
| 1,759,769 A | * | 5/1930 | Vuillaume | |
| 4,826,520 A | * | 5/1989 | Kawazoe et al. | 65/21.1 |
| 4,986,748 A | | 1/1991 | Brown et al. | 431/188 |
| 5,043,002 A | | 8/1991 | Dobbins et al. | 65/3.12 |
| 5,092,760 A | | 3/1992 | Brown et al. | 431/10 |
| 5,110,335 A | | 5/1992 | Miller et al. | 65/3.12 |
| 5,152,819 A | | 10/1992 | Blackwell et al. | 65/3.12 |
| 5,154,744 A | | 10/1992 | Blackwell et al. | 65/3.12 |
| 5,405,082 A | | 4/1995 | Brown et al. | 239/8 |
| 5,560,758 A | | 10/1996 | Brown et al. | 65/134.4 |
| 5,702,495 A | * | 12/1997 | Hiraiwa et al. | 65/531 |
| 6,079,225 A | * | 6/2000 | Ruppert et al. | 65/17.2 |

FOREIGN PATENT DOCUMENTS

| | | | | |
|---|---|---|---|---|
| JP | 54-30853 | * | 3/1979 | 65/531 |
| JP | 58-2171 | * | 1/1983 | 65/531 |
| JP | 60-228812 | * | 11/1985 | 65/531 |
| JP | 63-139030 | * | 6/1988 | 65/531 |
| JP | 63-274637 | * | 11/1988 | 65/531 |
| JP | 3-69527 | * | 3/1991 | 65/531 |
| JP | 4-228440 | * | 8/1992 | 65/531 |
| WO | 97/22553 | | 6/1997 | |

OTHER PUBLICATIONS

English translation of Japanese Patent Publication No. 54–030853 (1979).
English translation of Japanese Patent Publication No. 58–002171 (1983).
English translation of Japanese Patent Publication No. 63–274637 (1988).
English translation of Japanese Patent Publication No. 3–069527 (1991).
U.S. Patent application Ser. No. 08/767,653, filed Dec. 17, 1996.
U.S. Patent application Ser. No. 08/903, 501, filed Jul. 30, 1997.

* cited by examiner

*Primary Examiner*—Michael Colaianni
(74) *Attorney, Agent, or Firm*—Maurice K. Klee; Timothy M. Schaeberle

(57) ABSTRACT

Burners (40) for producing fused silica boules are provided. The burners employ a tube-in-tube (301–306) design with flats (56, 50) on some of the tubes (305, 301) being used to limit the cross-sectional area of certain passages (206, 202) within the burner and/or to atomize a silicon-containing, liquid source material, such as OMCTS. To avoid the possibility of flashback, the burner has separate passages for fuel (205) and oxygen (204, 206), i.e., the burner employs nozzle mixing, rather than premixing, of the fuel and oxygen. The burners are installed in burner holes (26) formed in the crown (20) of a furnace and form a seal with those holes so that ambient air cannot be entrained into the furnace through the holes. An external air cooled jacket (60) can be used to hold the temperature of the burner below a prescribed upper limit, e.g., 400° C.

33 Claims, 9 Drawing Sheets

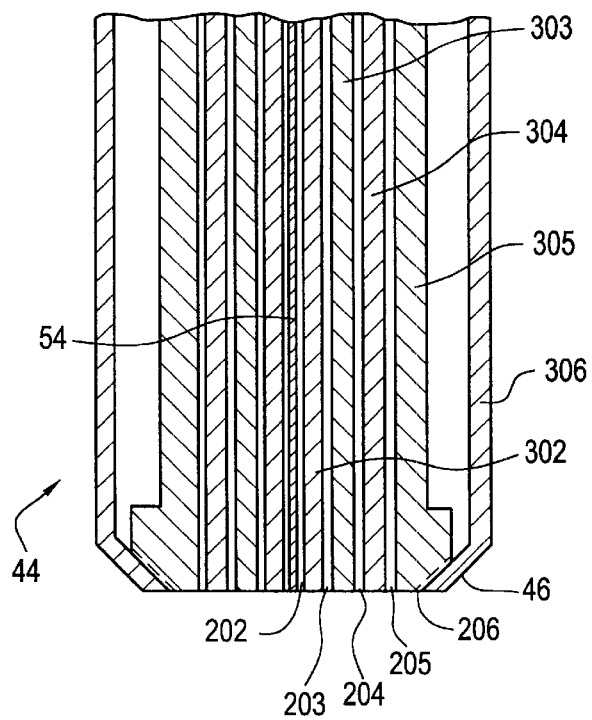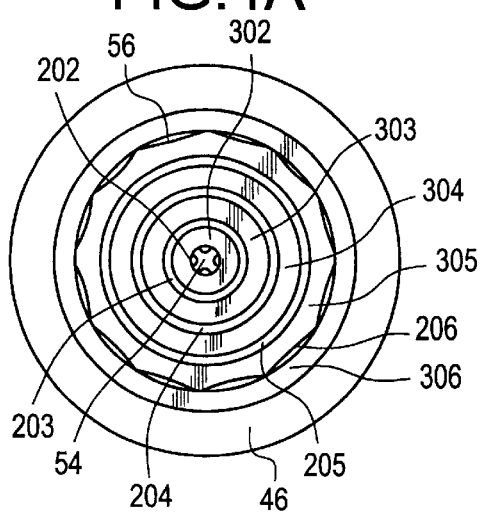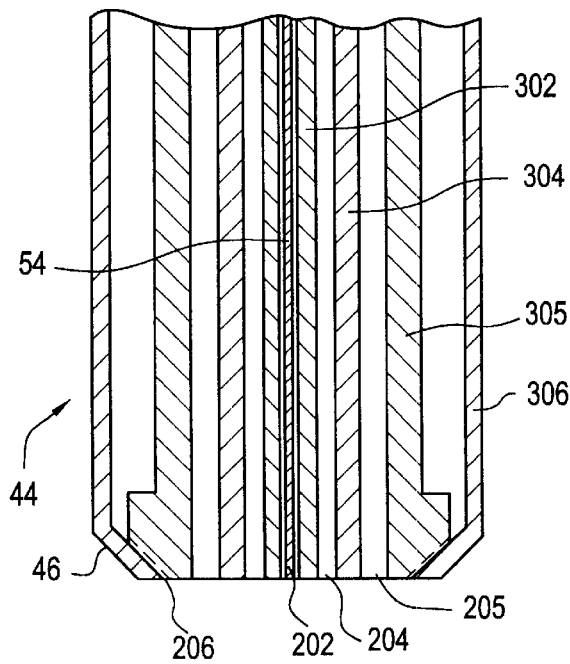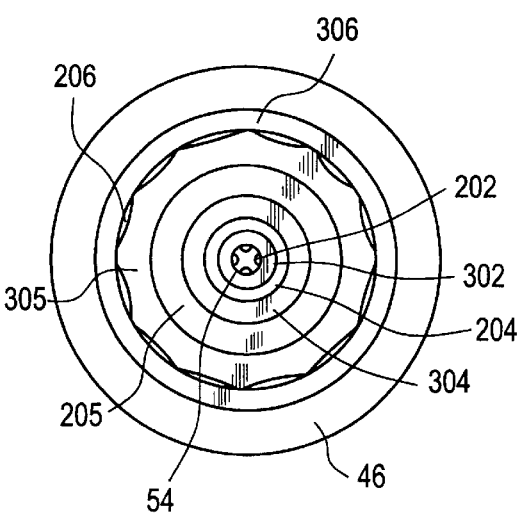

US 6,588,230 B1

SEALED, NOZZLE-MIX BURNERS FOR SILICA DEPOSITION

This application claims the benefit of Provisional application ser. No. 60/095,741 filed Aug. 7, 1998.

U.S. GOVERNMENT RIGHTS

The government of the United States of America has rights in this invention pursuant to Subcontract No. B299143 awarded by the Regent of the University of California under prime contract No. W-7405-ENG-48 awarded by the U.S. Department of Energy.

FIELD OF THE INVENTION

This invention relates to fused silica glass and, in particular, to burners for producing silica soot from which such glass can be made. As used herein, the term "silica glass" includes glass which is pure or may contain one or more dopants, as does the term "silica soot".

BACKGROUND OF THE INVENTION

An effective method for making fused silica glass comprises the steps of: (1) generating silica soot particles using soot producing burners, and (2) collecting and consolidating the particles on a rotating substrate to form a glass "boule". Such boules can have diameters on the order of five feet (1.5 meters) and thicknesses on the order of 5–10 inches (13–25 cm). The process is typically carried out in a furnace which has a rotatable base, an outer ring wall, and a crown which carries the soot producing burners.

FIG. 1 shows the front face 8 of a soot producing burner 7 which has been used in the past to produce fused silica boules. This burner has five zones or regions 10, 12, 14, 16, and 18 through which gases of different compositions pass to (1) supply the raw material(s) from which the soot particles are produced, and (2) generate a flame of suitable size and temperature to (a) convert the raw material(s) into soot particles and (b) generate sufficient heat to consolidate the particles as they are collected at the surface of the boule.

For the burner of FIG. 1, region 10 is referred to as the "fume tube" and carries, for example, a mixture of nitrogen gas and a vaporized silicon-containing compound, regions 12 and 18 are known as the inner and outer shields, respectively, and carry oxygen, and regions 14 and 16 are referred to as the "premix rings" and carry a mixture of fuel (e.g., methane) and oxygen. The diameter of outer shield 18 is typically about 1.1 inches (2.8 cm), while the overall dimensions of front face 8 are typically about 3.4 inches by 3.4 inches (8.5 cm by 8.5 cm).

Historically, the vaporized silicon-containing compound supplied to fume tube 10 was silicon tetrachloride or a mixture of silicon tetrachloride and chlorides of other materials, e.g., titanium tetrachloride, when a doped glass was desired. As a result of environmental concerns, silicon tetrachloride has now been replaced with halide-free, silicon-containing compounds, of which octamethylcyclotetrasiloxane (OMCTS) is a particularly preferred example since in addition to providing silicon, it is also provides energy for the burner's flame. In the same manner, organometallic compounds have been substituted for chloride compounds in the production of doped glasses.

FIG. 2 shows the manner in which burners of the type shown in FIG. 1 have been positioned relative to the furnace's crown 20. With regard to the present invention, it is significant to note that burner 7 is spaced from the outer face 22 of the crown (the "cold" face of the crown) by gap 24. This gap, which in practice is about a quarter inch in height, allows air to be inspirated into the furnace so as to cool burner hole 26 and prevent soot buildup on the walls of the hole. The entrained air also ensures that complete combustion of the fuel occurs in burner flame 38.

In addition to illustrating the spatial relationship between burner 7 and crown 2, FIG. 2 also shows the connection of feed lines 28, 30, and 32 to the burner, as well as lines 34 and 36 which carry cooling water to and from the burner.

Although burners and burner/crown configurations of the type shown in FIGS. 1 and 2 have worked successfully in practice, they have had some drawbacks. In particular these burners have suffered from the following problems:

(1) Maintenance Problem

Because of their relatively large frontal areas exposed to furnace conditions, the previously used burners tend to collect deposits on burner face 8 which must be removed to avoid variations in the burner's flame characteristics and/or the soot produced by the burner. In particular, large frontal areas make a burner subject to recirculation effects whereby soot which is not deposited on the boule recirculates back and fouls the face of the burner.

(2) Water Cooling Problem

The large frontal areas of the previously used burners also result in substantial heat transfer from the hot furnace to the burner, thus requiring water cooling of the burners. This is especially so in view of the fact that the burners are made out of aluminum. (It should be noted that the heat transfer occurs both through burner hole 26 and through the crown material itself since the crown is desirably made as thin as possible.) The need for water cooling makes the burners more complex to build and operate.

(3) Furnace Atmosphere Control Problem

The inspiration of air through the burner holes in the crown makes it more difficult to control the composition of the atmosphere within the furnace. Variations in the furnace atmosphere can result in variations in the properties (e.g., hydrogen content) of the glass boules produced by a furnace, both between different parts of a single boule and between different boules.

(4) Emissions Problem

The inspiration of air through the burner holes can also result in elevated levels of $NO_x$ in the exhaust gases exiting the furnace since $N_2$ is the major constituent of the inspirated air and furnace temperatures are high enough for $NO_x$ production, e.g., above 1600° C.

(5) Energy Consumption Problem

Inspiration of ambient air through the burner holes leads to an increase in the amount of energy which must be inputted to the furnace to keep it at its operating temperature.

(6) Potential Safety Problem

The feeding of a premix of fuel and oxygen to regions 14 and 16 makes these regions and the feed lines leading thereto susceptible to flame flashback.

As discussed below, the burners of the present invention address and provide solutions to each of these problems.

DESCRIPTION OF THE PRIOR ART

The use of halide-free, silicon-containing compounds to form fused silica glasses by soot deposition is discussed in Dobbins et al., U.S. Pat. No. 5,043,002, and Blackwell et al., U.S. Pat. No. 5,152,819. The incorporation of a dopant, specifically, titanium, in such glasses is discussed in Blackwell et al., U.S. Pat. No. 5,154,744. The contents of these prior patents are incorporated herein by reference.

PCT Patent Publication No. WO 97/22553, published on Jun. 26, 1997, discloses soot producing burners which can be used with halide-free, silicon-containing compounds such as octamethylcyclotetrasiloxane (OMCTS). The halide-free, silicon-containing compound is preferably provided to the burner as a liquid, atomized in the burner by an integral atomizer, and then directly converted into soot particles by the burner's flame. See also pending U.S. applications Ser. No. 08/767,653 and Ser. No. 08/903,501, filed Dec. 17, 1996 and Jul. 30, 1997, respectively, the contents of both of which are incorporated herein by reference.

Miller et al., U.S. Pat. No. 5,110,335 discloses a burner for producing soot from silicon tetrachloride which includes an ultrasonic nozzle which when operated at a frequency of 120 kilohertz converts liquid silicon tetrachloride into a fine mist.

Brown et al., U.S. Pat. No. 5,092,760 discloses an oxygen/fuel burner which atomizes liquid fuel by means of an integral atomizer. Brown et al., U.S. Pat. Nos. 5,405,082 and 5,560,758, disclose oxygen/fuel burners for use in glass conditioning. These burners employ a tube-in-tube construction and, during use, are sealed to the wall of a glass distribution channel. Brown et al., U.S. Pat. No. 4,986,748 discloses a further construction for an oxygen/fuel burner. Significantly, with regard to the present invention, the burners of these various Brown et al. patents are concerned with heat production, not with the production of silica soot. Among other things, such heat producing burners do not have to be concerned with soot build-up on the burner face or with the adverse effects of the burner's internal operating temperature on the heat-sensitive raw material(s) used to produce silica soot.

SUMMARY OF THE INVENTION

In view of the foregoing, it is an object of the present invention to provide improved burners for producing silica soot. More particularly, it is an object of the invention to provide improved burners which overcome some and preferably all of the above problems of previously used soot producing burners.

The invention achieves these and other objects by providing soot producing burners and furnaces employing such burners which have some or all of the following properties:

(1) The burner uses a tube-in-tube design so as to reduce the frontal area of the burner and thus minimize the soot build-up problem. For example, the frontal area of a burner constructed in accordance with the invention can be about 0.32 square inches (2.1 square centimeters) whereas burners of the type shown in FIGS. 1 and 2 had frontal areas of about 1.8 square inches (11.4 square centimeters).

The tube-in-tube design produces a plurality of passages for carrying liquid and/or gaseous materials, namely, a first passage constituting the bore of the innermost (first) tube, a second passage defined by the outer surface of the first tube and the inner surface of the next innermost (second) tube (the first pair of tubes), a third passage defined by the outer surface of the second tube and the inner surface of the third tube (the second pair of tubes), and so on. In this way, "n" tubes define "n" passages.

Not all passages need extend throughout the entire length of the burner. For example, as discussed below, the first tube may end prior to the face of the burner, whereupon the contents of the first passage merge with the contents of the second passage. The innermost passage at the face of the burner is then defined by the inner surface of the second tube, rather than the inner surface of the first tube.

(2) To provide a focused, relatively uniform flow pattern, one or more of the passages produced by the tube-in-tube design can include flats in, for example, the vicinity of the burner's face which serve to guide the flow of gas out of the burner. These flats can be oriented at an angle with respect to the burner's face, e.g., at an angle of approximately 75 degrees with respect to the burner's axis (see FIG. 4). The flats are preferably formed on the outer surface of the inner tube of the pair of tubes which defines the passage. Alternatively, although less preferred for manufacturing reasons, the flats can be formed on the inner surface of the outer tube of the pair of tubes which defines the passage. It should be noted that in either case, sizing the tubes so that they make contact at the corners of the flats in the case of flats on the inner tube or at the centers of flats in the case of flats on the outer tube results in a passage of limited cross-sectional area. This contacting also aids in centering the inner tube within the bore of the outer tube.

(3) Flats can also serve to atomize a liquid raw material, e.g., liquid OMCTS or a mixture of liquid OMCTS and one or more liquid dopants. In particular, in accordance with these aspects of the invention, the liquid raw material is subjected to shear forces as it passes through a restriction zone formed by flats. Preferably, the passage which carries the liquid raw material has a cross-sectional area which decreases as the raw material approaches the restriction zone and a cross-sectional area which increases after the raw material has passed through the restriction zone. Such changes in cross-sectional areas can be achieved by, for example, tapering one or both of the tube surfaces which define the passage. In addition to the restriction zone, the passage carrying the liquid raw material preferably merges with a passage carrying gas, e.g., a passage carrying oxygen, downstream of the restriction zone to further enhance the atomization of the liquid raw material.

In comparison to orifices, flats have the advantage of being able to achieve atomization for low flow rates of a liquid raw material, e.g., flow rates less than about 10 grams/minute.

(4) To minimize soot deposition on the face of the burner, it has been found that the passage which provides soot producing raw material(s) to the burner flame needs to extend beyond the face of the burner. Preferably, this passage is the center passage of the burner and the passages surrounding the center passage, which carry fuel and oxygen, are angled towards the center passage to further reduce soot build up on the burner face.

(5) The burners are sealed to the crown of the furnace so as to substantially completely eliminate inspiration of air into the furnace at the locations of the burners. Preferably, inspiration is completely eliminated although in some cases, minor amounts of leakage of air at the crown/burner interface can be tolerated without encountering the various problems discussed above which result from large amounts of air passing through a burner hole.

(6) Cooling of such sealed burners is accomplished by the flow of gases through the burner. In particular, oxygen is flowed through the outermost passage of the burner where the greatest amount of heat transfer from the crown occurs. In addition, the burner can be equipped with an external air cooled jacket to further reduce its internal operating temperature.

(7) The burner has completely separate passages for fuel (e.g., methane, natural gas, hydrogen, etc.) and oxygen so that the mixing of fuel and oxygen does not occur until after these materials have exited the burner face, thus eliminating the possibility of flashback. That is, the burner of the invention uses "nozzle mixing" of the fuel and oxygen rather than "premixing" of these materials.

By means of these features, the invention provides improved burners which are economical to build, use, and service, and which allow for more efficient and controlled production of fused silica boules.

BRIEF DESCRIPTION OF THE DRAWINGS

FIG. 4 is a cross-sectional view of a first embodiment of the nozzle portion of the burner of FIG. 3.

FIG. 4A shows the face of the burner of FIG. 4.

FIG. 10 is a cross-sectional view of a second embodiment of the nozzle portion of the burner of FIG. 3.

FIG. 10A shows the face of the burner of FIG. 10.

Figure 1:
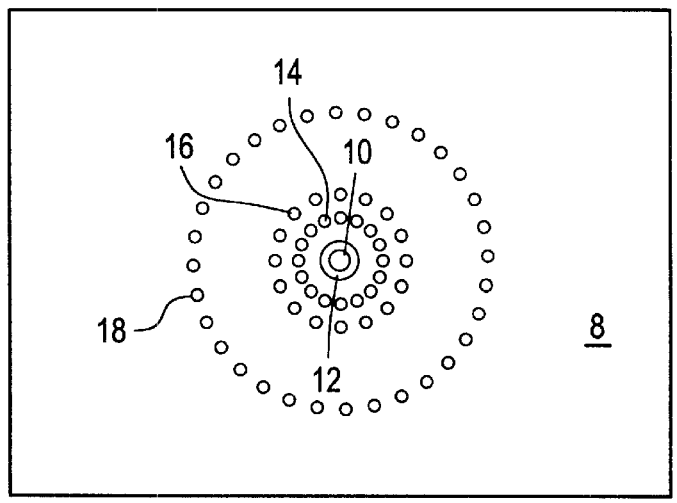
FIG. 1 is a schematic drawing of the front face of a prior art burner for producing silica soot.

The foregoing drawings, which are incorporated in and constitute part of the specification, illustrate the preferred embodiments of the invention, and together with the description, serve to explain the principles of the invention. It is to be understood, of course, that both the drawings and the description are explanatory only and are not restrictive of the invention.

The reference numbers used in the drawings correspond to the following:

| | |
|---|---|
| 1–6 | flow arrows |
| 7 | previously used soot producing burner |
| 8 | front face of previously used soot producing burner |
| 10 | fume tube of previously used soot producing burner |
| 12 | inner shield of previously used soot producing burner |
| 14 | premix ring of previously used soot producing burner |

-continued

| | |
|---|---|
| 16 | premix ring of previously used soot producing burner |
| 18 | outer shield of previously used soot producing burner |
| 20 | furnace crown |
| 22 | outer face of furnace crown |
| 24 | gap between previously used soot producing burner and furnace crown |
| 26 | burner hole |
| 28 | feed line |
| 30 | feed line |
| 32 | feed line |
| 34 | line for cooling water |
| 36 | line for cooling water |
| 38 | burner flame |
| 40 | burner of present invention |
| 42 | manifold portion of burner 40 |
| 44 | nozzle portion of burner 40 |
| 46 | chamfered surface of nozzle 44 |
| 48 | restriction zone |
| 50 | flats on tube 301 |
| 52 | spaces formed by flats 50 |
| 54 | restriction rod |
| 56 | flats on tube 305 |
| 58 | spaces formed by flats 56 |
| 60 | air cooled jacket |
| 62 | air inlet of air cooled jacket |
| 64 | air outlet of air cooled jacket |
| 66 | internal plenum of air cooled jacket |
| 68 | external plenum of air cooled jacket |
| 70 | air flow arrow |
| 72 | annular ring for atomization |
| 74 | burner axis |
| 101–106 | entrance ports |
| 201–206 | passages |
| 301–306 | tubes |
| 403–406 | drilled apertures |

DESCRIPTION OF THE PREFERRED EMBODIMENTS

Figure 3:
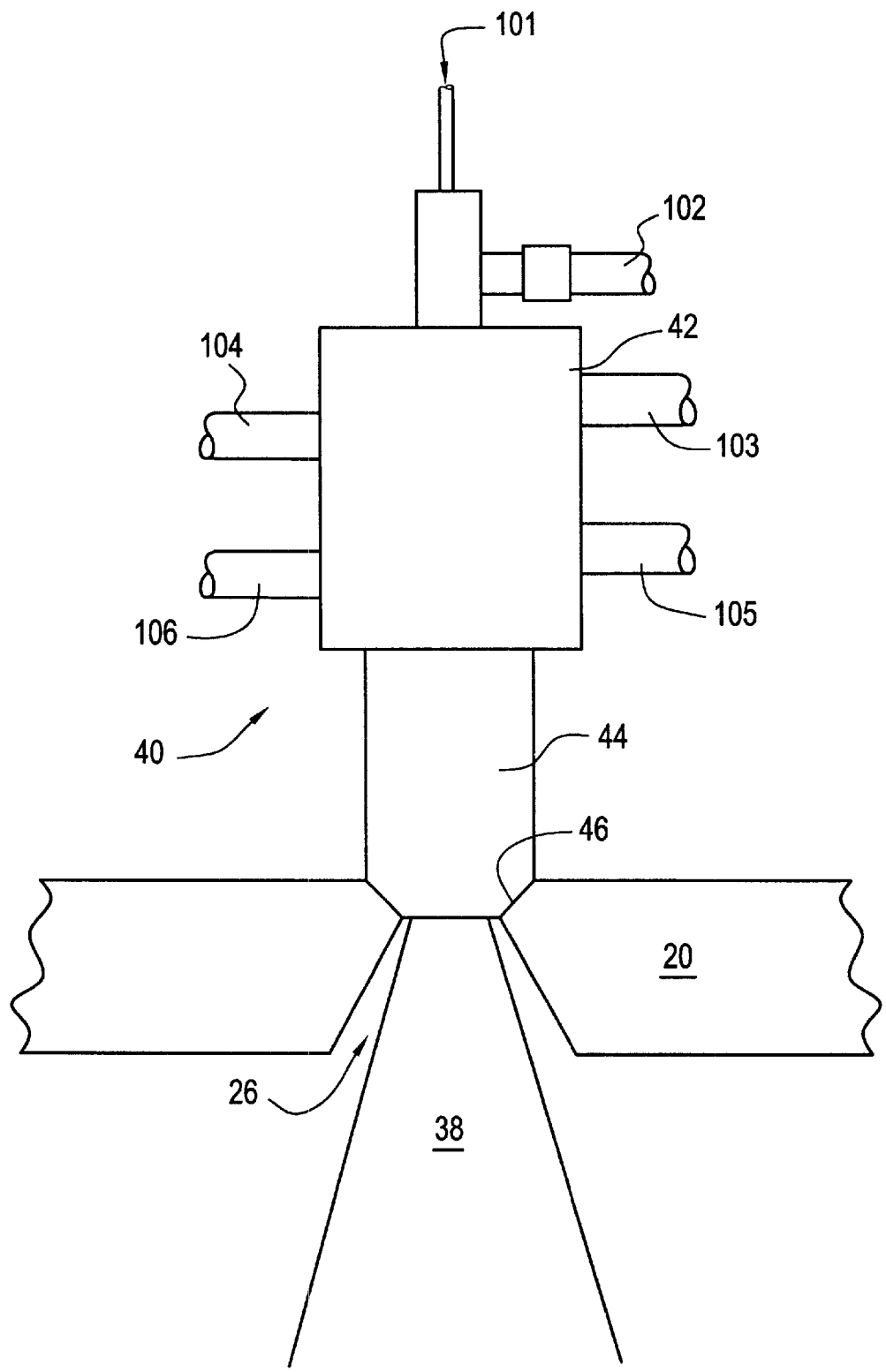
FIG. 3 is a schematic side view of a burner constructed in accordance with the present invention showing the sealed relationship between the burner and the furnace crown.

As discussed above, the present invention relates to improved burners for use in producing fused silica boules. FIG. 3 is a schematic drawing showing the overall construction of such a burner. As shown therein, burner 40 includes manifold portion 42 and nozzle portion 44. The nozzle portion forms a seal with crown 20 at chamfered surface 46.

Figure 5:
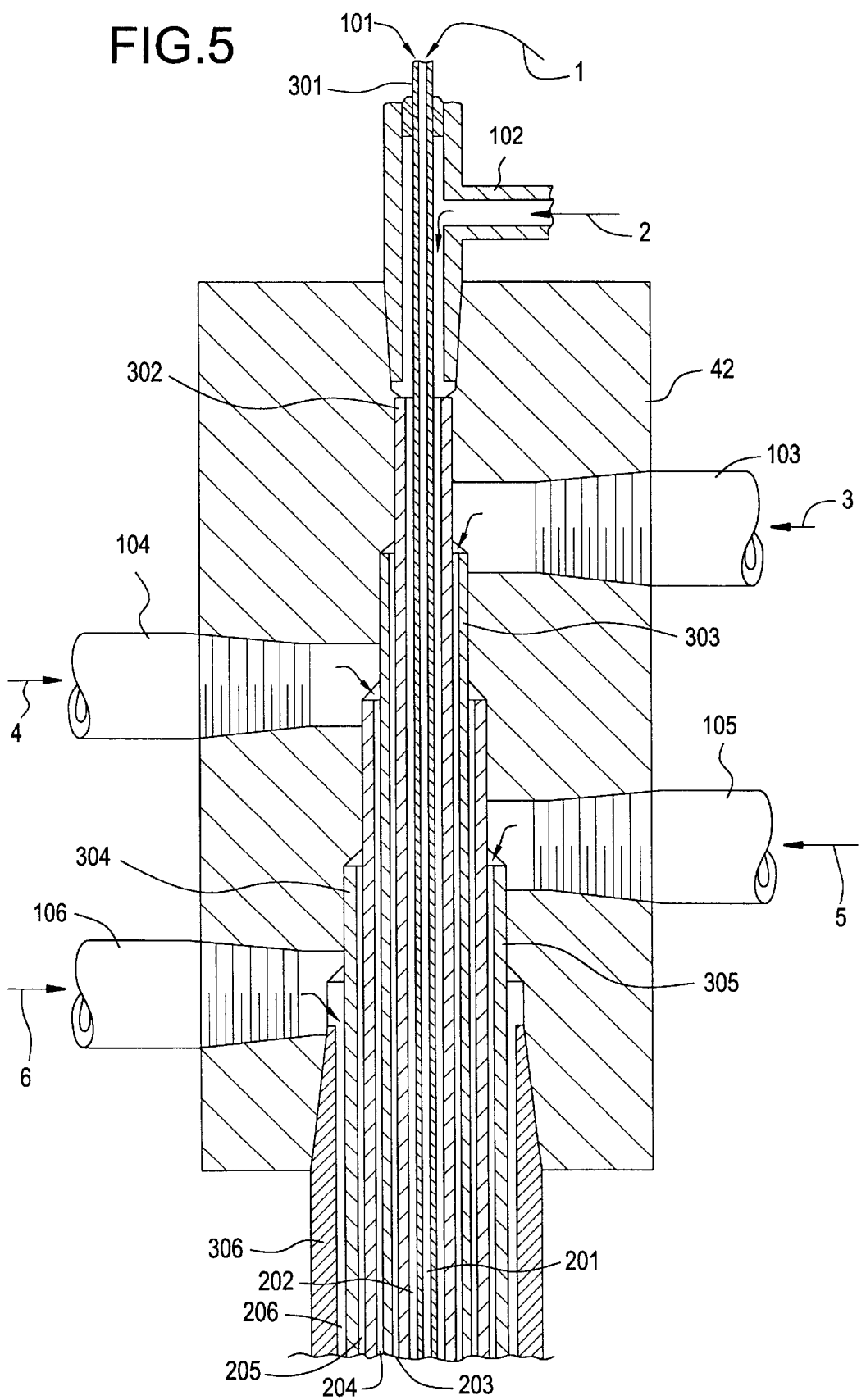
FIG. 5 is a cross-sectional view of the manifold portion of the burner of FIG. 3.

Manifold portion 42 has six entrance ports for receiving processing gases, fuel, and the raw material(s) which forms the soot. As shown in FIG. 5, the burner includes six tubes which by means of the tube-in-tube construction form six passages for carrying the gases, fuels, and raw materials (collectively, the "source materials"). Table 1 sets forth the correspondence between the source materials, the entrance ports, the passages, and the tubes.

FIGS. 6–9 illustrate the use of a restriction zone 48 formed by flats 50 on the outer surface of tube 301 to apply shear to the liquid raw material flowing in passage 202. For OMCTS, the spaces 52 between the outer surface of tube 301 and the inner surface of tube 302 at the restriction zone can, for example, have a maximum thickness of 0.005 inches (0.13 millimeters). All other dimensions being held constant, the use of more or less flats will respectively decrease or increase this maximum thickness. Using routine experimentation, persons skilled in the art can readily determine a suitable number of flats for any particular application of the invention.

Figure 6:
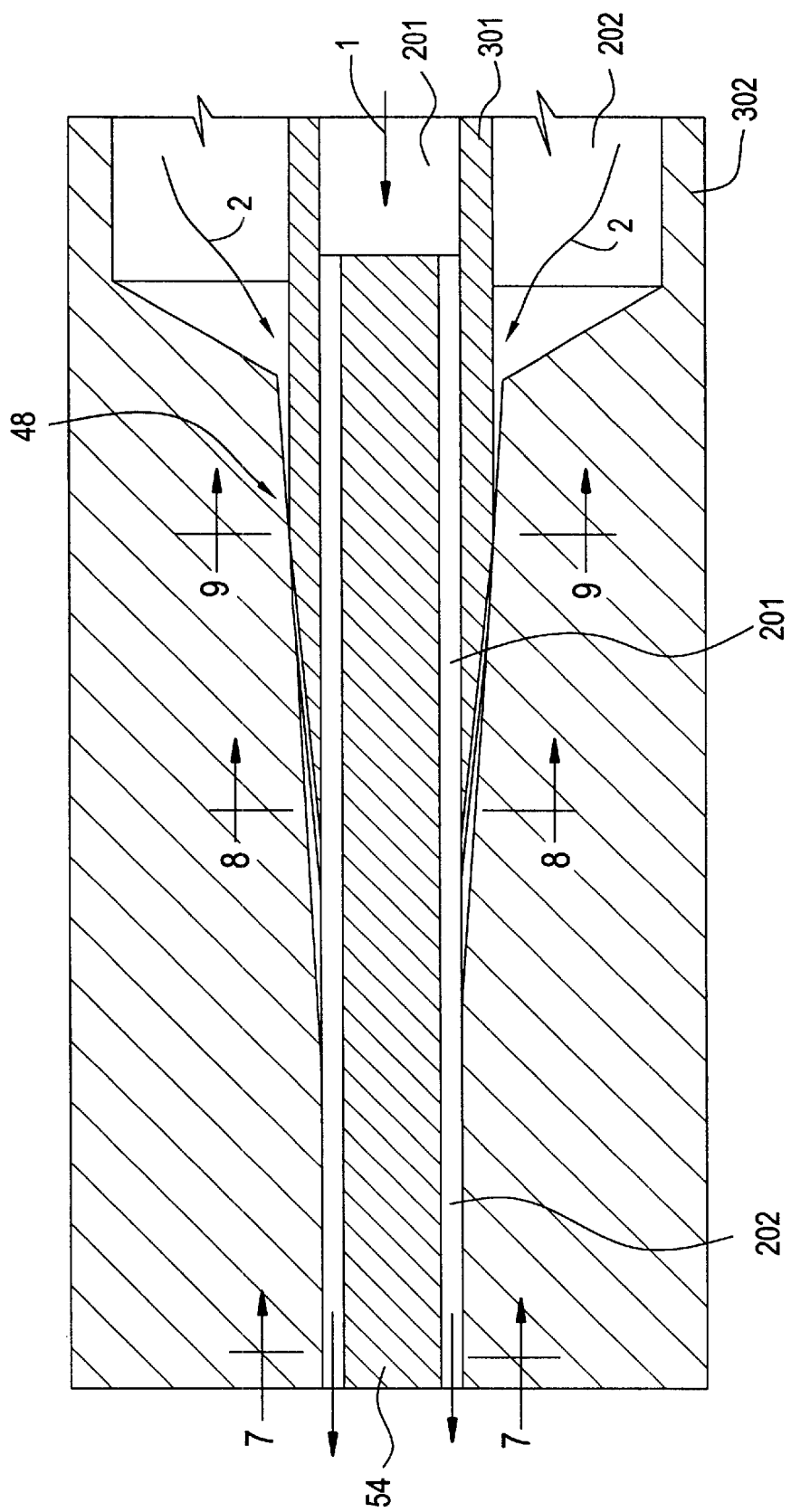
FIG. 6 is a cross-sectional view of an internal atomizer constructed in accordance with the invention.
Figure 7:
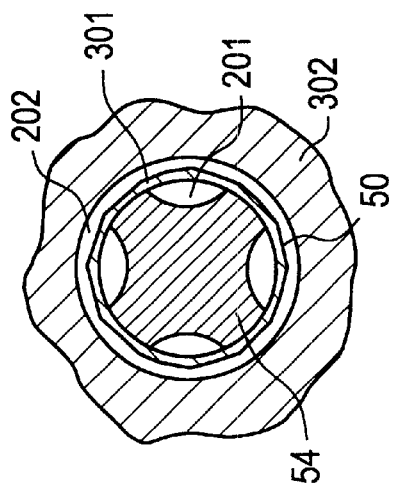
FIG. 7 is a cross-sectional view along lines 7—7 in FIG. 6.
Figure 8:
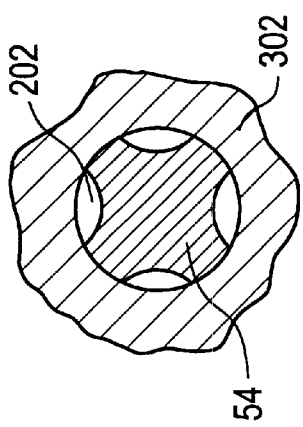
FIG. 8 is a cross-sectional view along lines 8—8 in FIG. 6.

As also shown in FIGS. 6–9, the cross-sectional area of passage 202 decreases as the liquid raw material approaches the restriction zone and then increases after the raw material has passed through the restriction zone. As shown in FIG. 6, these decreases and increases in cross-sectional area can be achieved by providing the outer surface of tube 301 and the inner surface of tube 302 with tapers which begin at different locations and have different taper angles. For example, the outer surface of tube 301 can begin tapering closer to the face of the burner and can have a taper angle of, for example, 5° while the inner surface of tube 302 can begin tapering farther from the burner face and can have a taper angle of, for example, 3½°. In this way, these surfaces converge before the restriction zone and diverge after that zone. Other taper configurations can, of course, be used in the practice of the invention. For example, the outer surface of tube 301 can have a taper angle of 4° when used with the embodiment of FIG. 11.

FIGS. 6–9 also illustrate (1) the merger of passage 202 with passage 201 downstream of the restriction zone and (2) the use of a restriction rod 54 to reduce the cross-sectional area of passage 202 after the merger and to also reduce the cross-sectional area of passage 201 prior to the merger. The use of this restriction rod in combination with the merger of passage 201 with passage 202 further enhance the atomization of the liquid raw material. In particular, the merger and the restriction rod enhance atomization through the application of relatively high pressure 02 to the droplets of liquid raw material created at the restriction zone.

Figure 14:
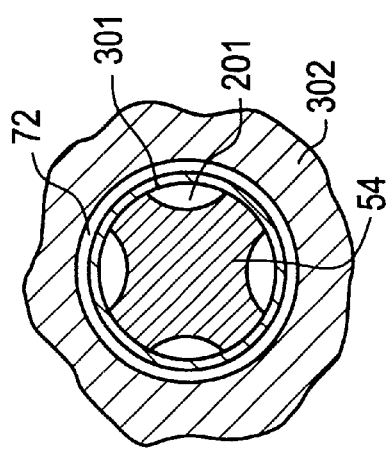
FIG. 14 is a cross-sectional view along lines 14—14 in FIG. 13.
Figure 9:
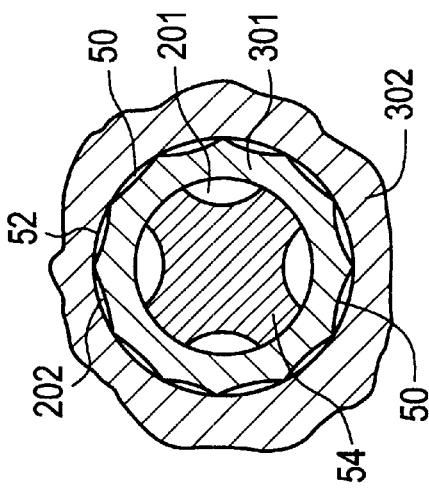
FIG. 9 is a cross-sectional view along lines 9—9 in FIG. 6.
Figure 13:
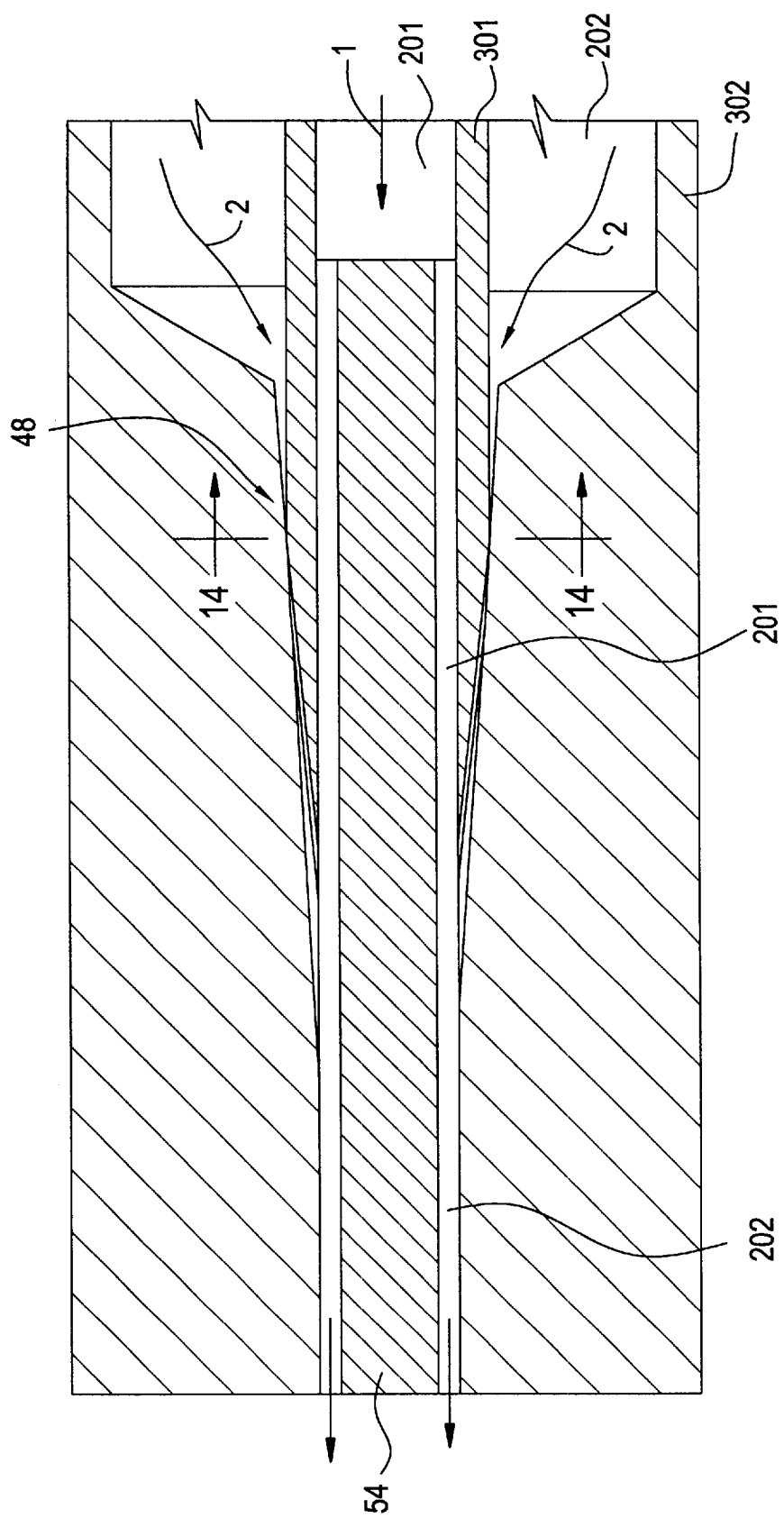
FIG. 13 is a cross-sectional view of an alternate internal atomizer constructed in accordance with the invention.

Other configurations for restriction zone 48 include the following:

(1) Rather than using flats 50, tube 301 can be positioned relative to tube 302 to form a thin annular ring which serves to atomize the liquid raw material. This approach is illustrated in FIGS. 13 and 14, where the annular ring is identified in FIG. 14 by the reference number 72. A suitable thickness for such an annular ring is approximately 0.004 inches (0.1 millimeters). Such a thickness can be readily achieved by retracting tube 301 relative to tube 302 by about 3/64 of an inch (1.2 millimeters).

(2) The passages which carry the liquid raw material and the atomizing oxygen can be reversed, e.g., passage 201 can carry the liquid raw material and passage 202 can carry the oxygen. In this case, flats 50 serve to reduce the cross-sectional area of passage 202 and, along with the taper on the inner surface of tube 302, serve to guide the oxygen into the stream of liquid raw material so as to break the stream into droplets.

(3) Variations (1) and (2) can be combined, i.e., the flats can be removed and the passages which carry the liquid raw material and the atomizing oxygen can be reversed.

FIGS. 4 and 4A show the nozzle portion of burner 40 downstream of restriction zone 48. To reduce the cross-sectional area of passage 206, tube 305 includes flats 56. The spaces 58 between the outer surface of tube 305 and the inner surface of tube 306 formed by these flats can, for example, have a maximum thickness of 0.01 inches (0.25 millimeters). As with flats 50, the use of more or less flats will respectively decrease or increase this maximum thickness. Using routine experimentation, persons skilled in the art will readily be able to determine a suitable number of flats for any particular application of the invention.

FIGS. 10 and 10A show a variation of FIGS. 4 and 4A wherein passage 203 has been omitted. Corresponding changes are made to the manifold portion of the burner (not shown).

Figure 11:
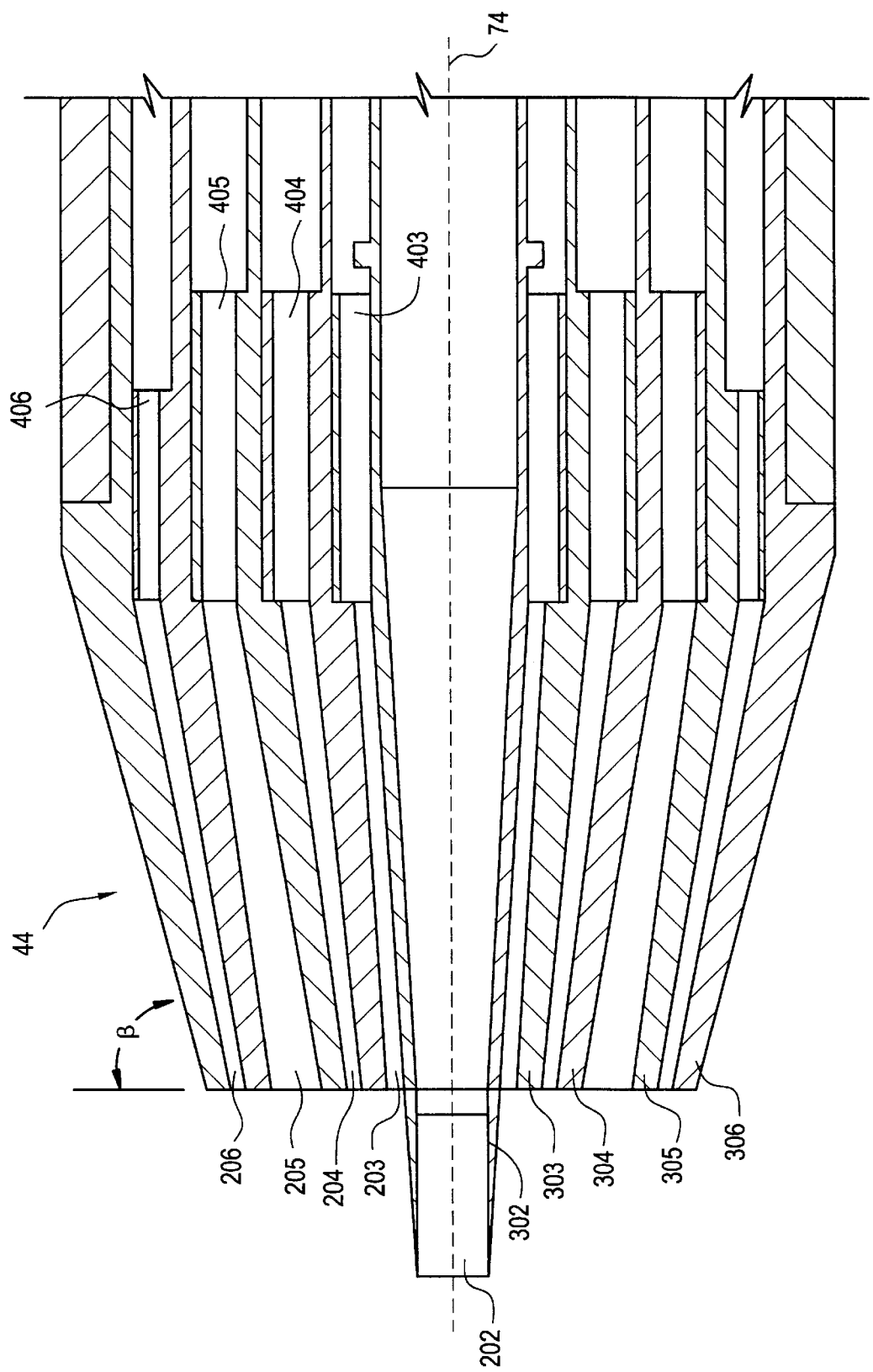
FIG. 11 is a cross-sectional view of a third embodiment of the nozzle portion of the burner of FIG. 3.

FIG. 11 shows a further variation in which passage 202 extends beyond the face of the burner and passages 203, 204, 205, and 206 are angled towards passage 202 to fully develop (streamline) the gas flows exiting the burner face and thus improve the burner's flame characteristics. The amount of extension of passage 202 beyond the face of the burner will depend upon the particular application of the invention. In general, this extension will be about 0.25 inches (6.4 millimeters).

As can be seen in FIG. 11, passage 204 narrows as it approaches the face of the burner, while passage 205 widens. The inclination of the inner and outer surfaces of tubes 302, 303, 304, 305, and 306 relative to the burner's axis is set forth in Table 2. The values given in this table are for natural gas as the fuel and OMCTS as the silicon-containing raw material. Different angles may be required for other fuels and source materials. Based on the disclosure herein, the particular angles and dimensions to be used for any particular application of the invention can be readily determined by those skilled in the art using routine experimentation.

FIG. 11 also illustrates the use of drilled apertures 403, 404, 405, and 406 to form portions of passages 203, 204, 205, and 206, respectively. These apertures facilitate the manufacture of the various tubes making up the burner through a combination of drilling the apertures and machining the tube surfaces to achieve the desired part configurations.

Although not shown in FIG. 11, the atomization apparatus of FIGS. 6–9 or the variations thereof discussed above can be incorporated in this burner in the same manner as it is incorporated in the burners of FIGS. 4 and 10. On the other hand, the burner of FIG. 11, as well as those of FIGS. 4 and 10, can be used without an internal atomizer. In such a case, the soot producing material, e.g., OMCTS, is provided to entrance port 102 in vaporized form, optionally mixed with, for example, nitrogen, from which it passes to the face of the burner through passage 202. Entrance port 101 and tube 301 are then not included as part of the burner.

Figure 12:
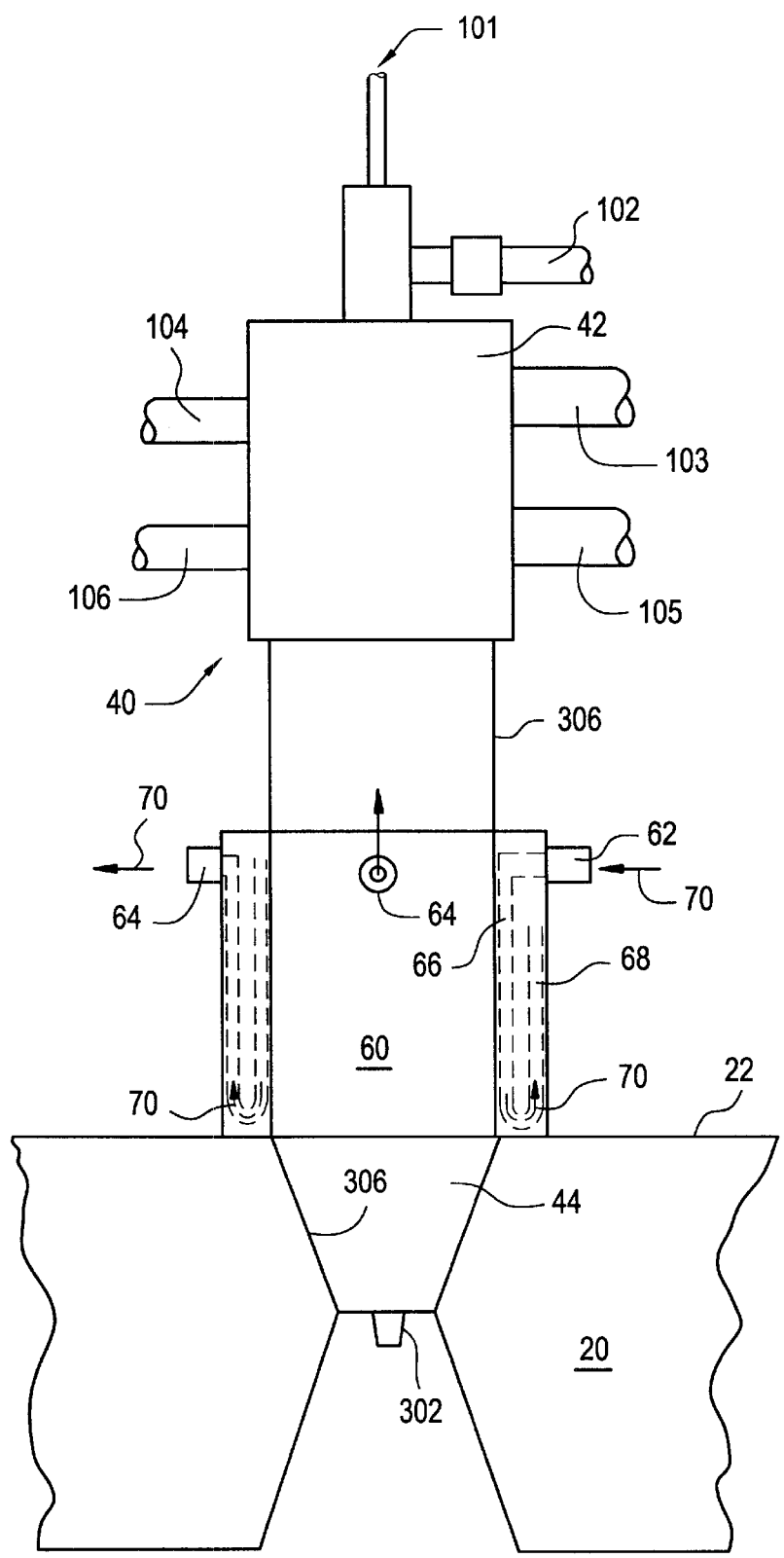
FIG. 12 is a schematic diagram illustrating the use of an air cooled jacket to reduce the burner's internal operating temperature.

FIG. 12 illustrates the use of an external air cooled jacket 60 for providing additional cooling to the burner in cases where the internal flow of gases through the burner is not sufficient to keep the burner's internal operating temperature at a desired value. Air cooled jacket 60 has an air inlet 62 which is connected to an internal plenum 66. It also has a series of air outlets 64 which are connected to external plenum 68. The cross-sectional area of the external plenum is preferably greater than the cross-sectional area of the internal plenum to accommodate the increase in volume of the cooling air as it is heated by contact with the outer surface of tube 306.

Figure 2:
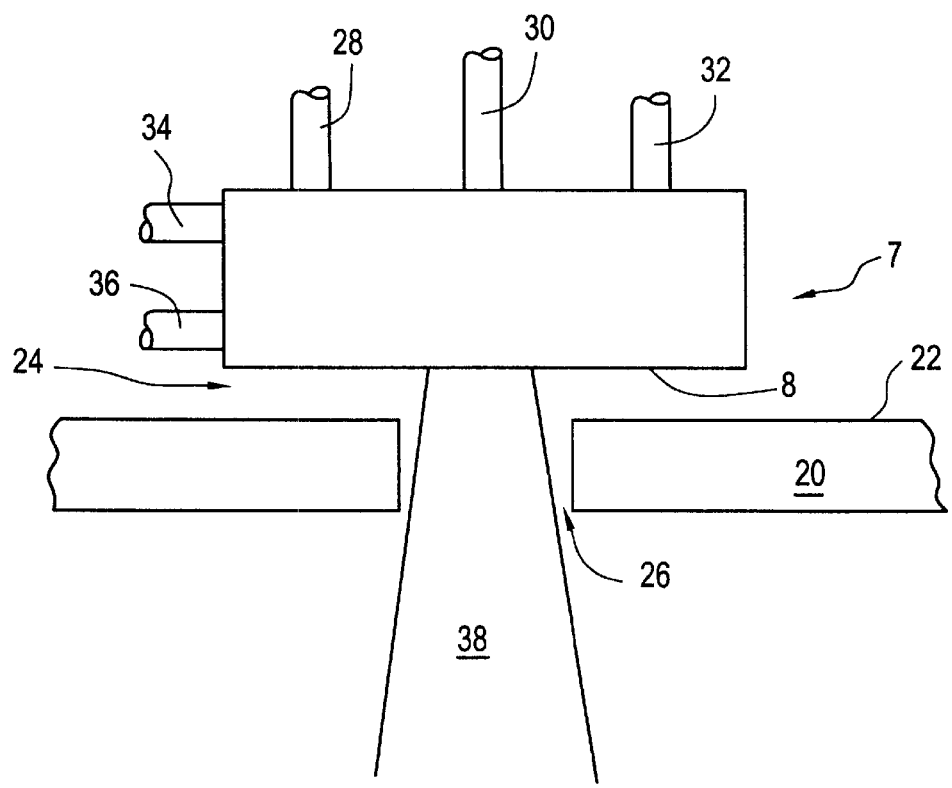
FIG. 2 is a schematic side view of a prior art burner showing the spaced relationship between the burner and the furnace crown.

FIG. 12 also illustrates the mating of the burner of FIG. 11 with the furnace's crown. Since the front end of the nozzle of this burner is already slanted, a chamfer is not required to provide a suitable surface for sealing engagement with burner hole 26. It should be noted that the burner of FIGS. 11 and 12, as well as those of FIGS. 4 and 10, are self-aligning with respect to burner hole 26. This feature provides more efficient furnace assembly compared to the prior art burner of FIGS. 1 and 2 which had to be aligned with the burner hole. Also, impingement of the burner flame on the walls of the burner hole is less likely with the burners of the invention than with the previously used burners.

The burner of FIGS. 11 and 12 was tested using the flow rates and source material temperatures set forth in Table 3. Room temperature air was supplied to air cooled jacket 60 at a rate of 15 cubic feet per hour. A thermocouple was mounted to the face of tube 306 and recorded temperatures in the range of 350–400° C. during operation of the burner. These temperatures are well within the operating range of a burner constructed of, for example, stainless steel and are suitable for use with OMCTS as the liquid raw material.

With tube 302 extending beyond the face of the burner and with $O_2$ flowing in passage 203, essentially no build up of soot on the face of the burner was observed. Soot build up, however, was observed when either of these preferred features of the burner was omitted.

A glass boule was prepared using vaporized OMCTS in a nitrogen carrier and the apparatus of FIGS. 11 and 12. The flow rates used are shown in Table 4. The burner was found to work successfully in all respects and to produce high quality glass.

Various materials can be used to construct the burners of the present invention. For example, manifold 42 can be constructed of aluminum, tube 306 of FIGS. 4 and 10 can be made of a refractory material, e.g., alumina, tube 306 of FIGS. 11 and 12 can be made of stainless steel, and all other tubes can likewise be made of stainless steel. Other materials can, of course, be used in the practice of the invention.

Although preferred and other embodiments of the invention have been described herein, further embodiments may be perceived by those skilled in the art without departing from the scope of the invention as defined by the following claims.

TABLE 1

| Source Material | Flow Arrow | Entrance Port | Passage | Passage Cross-Sectional Area in inches² (cm²)[1] | Tubes Which Define Passage |
|---|---|---|---|---|---|
| $O_2$ | 1 | 101 | 201 | 0.0034 (0.02) | Inner surface of 301. |
| Liquid raw material, e.g., OMCTS | 2 | 102 | 202 | 0.0034 (0.02) | Inner surface of 302 and outer surface of 301. |
| $O_2$ or an inert gas, e.g., argon[2] | 3 | 103 | 203 | 0.015 (0.09) | Inner surface of 303 and outer surface of 302. |
| $O_2$ | 4 | 104 | 204 | 0.037 (0.24) | Inner surface of 304 and outer surface of 303. |
| Fuel, e.g., natural gas, methane, or hydrogen[3] | 5 | 105 | 205 | 0.05 (0.32) | Inner surface of 305 and outer surface of 304. |
| $O_2$ | 6 | 106 | 206 | 0.098 (0.63) | Inner surface of 306 and outer surface of 305. |

[1]The values for cross-sectional area are calculated at the burner face except for passage 201 where the cross-sectional area is calculated at lines 8—8 or 9—9 in FIG. 6. The cross-sectional area of passage 202 represents the area with restriction rod 54 in place, i.e., it represents the cross-sectional area at lines 7—7 in FIG. 6.
[2]The use of an inert gas as flow 3 tends to delay combustion and thus move the burner's flame away from the burner's face which may be advantageous for some applications.
[3]The cross-sectional area of passage 205 is adjusted depending on which fuel is used. In particular, hydrogen requires a larger cross sectional area than methane or natural gas, e.g., twice the cross-sectional area.

TABLE 2

| Surface | Inclination Angle $\alpha$[1] |
|---|---|
| Inner surface of tube 302 | 3.5° to the right of the burner face; 0° to the left of the burner face. |
| Outer surface of tube 302 | 4° |
| Inner surface of tube 303 | 4° |
| Outer surface of tube 303 | 6.5° |
| Inner surface of tube 304 | 8° |
| Outer surface of tube 304 | 10° |
| Inner surface of tube 305 | 8° |
| Outer surface of tube 305 | 10° |
| Inner surface of tube 306 | 10° |
| Outer surface of tube 306 | 15° |

[1]Measured with respect to the burner's axis 74 shown in FIG. 11. The angle $\alpha$ equals 90° minus the angle $\beta$ shown in FIG. 11.

TABLE 3

| Source Material | Passage | Source Material Flow Rate | Source Material Temperature (° C.) |
|---|---|---|---|
| $O_2$ | 201 | 7 slpm | 15 |
| OMCTS | 202 | 6.5 g/min | 15 |
| $O_2$ | 203 | 10 slpm | 15 |
| $O_2$ | 204 | 20 slpm | 15 |
| Natural Gas | 205 | 20 slpm | 15 |
| $O_2$ | 206 | 20 slpm | 15 |

TABLE 4

| Source Material | Passage | Source Material Flow Rate | Source Material Temperature (° C.) |
|---|---|---|---|
| OMCTS | 202 | 6.5 g/min | 175 |
| $N_2$ | 202 | 5 slpm | 175 |
| $O_2$ | 203 | 10 slpm | 15 |
| $O_2$ | 204 | 20 slpm | 15 |
| Natural Gas | 205 | 20 slpm | 15 |
| $O_2$ | 206 | 20 slpm | 15 |

What is claimed is:

1. A method for making a fused silica glass comprising:
   (A) providing a burner for producing silica soot from a plurality of source materials, said burner having a burner face and a tube-in-tube construction which defines a plurality of passages for carrying flows of source materials to the burner face, said burner comprising:
      (a) a first entrance port which is connected to a first passage defined by a first tube, said first passage extending from the first entrance port towards the burner face;
      (b) a second entrance port which is connected to a second passage defined by the first tube and by a second tube, said second passage extending from the second entrance port towards the burner face;
      (c) a third entrance port which is connected to a third passage defined by the second tube and by a third tube, said third passage extending from the third entrance port towards the burner face;
      (d) a fourth entrance port which is connected to a fourth passage defined by the third tube and by a fourth tube, said fourth passage extending from the fourth entrance port towards the burner face;
      (e) a fifth entrance port which is connected to a fifth passage defined by the fourth tube and by a fifth tube, said fifth passage extending from the fifth entrance port towards the burner face; and (f) a sixth entrance port which is connected to a sixth passage defined by the fifth tube and by a sixth tube, said sixth passage extending from the sixth entrance port towards the burner face;

(B) providing oxygen to the burner's first entrance port;

(C) providing a silicon-containing source material to the burner's second entrance port;

(D) providing oxygen or an inert gas to the burner's third entrance port;

(E) providing oxygen to the burner's fourth entrance port;

(F) providing fuel to the burner's fifth entrance port; and (G) providing oxygen to the burner's sixth entrance port;

wherein:

(i) the sixth tube surrounds the fifth tube which surrounds the fourth tube which surrounds the third tube which surrounds the second tube which surrounds the first tube; and (ii) the silicon-containing source material is a liquid and the second passage comprises a restriction zone for atomizing the liquid, said restriction zone being located between the second entrance port and the burner face.

2. The method of claim 1 wherein at least one of the burner's tubes comprises flats for reducing a transverse cross-sectional area of a passage.

3. The method of claim 1 wherein the restriction zone comprises flats formed on at least one of the first and second tubes.

4. The method of claim 1 wherein the restriction zone comprises an annular ring of reduced cross-sectional area formed by a taper on at least one of the first and second tubes.

5. The method of claim 1 wherein the second passage has a transverse cross-sectional area which increases both in a direction from the restriction zone towards the second entrance port and in a direction from the restriction zone towards the burner face.

6. The method of claim 5 wherein at least one of the first and second tubes comprises a taper which produces said increases in transverse cross-sectional area.

7. The method of claim 1 wherein the first and second passages merge at a location between the restriction zone and the burner face.

8. The method of claim 7 wherein the burner further comprises a restriction rod which reduces at least one transverse cross-sectional area of the first passage and at least one transverse cross-sectional area of the merged first and second passages.

9. The method of claim 1 wherein the second tube extends beyond the face of the burner.

10. The method of claim 9 wherein the flows of source materials carried by the third, fourth, fifth, and sixth passages are angled towards the second tube at the burner face.

11. The method of claim 1 wherein the sixth tube has an outer surface which comprises an angled portion for sealing engagement with a burner hole formed in a crown of a furnace.

12. The method of claim 1 wherein the sixth tube has an outer surface and the burner further comprises an air cooled jacket which surrounds at least a portion of said outer surface.

13. The method of claim 1 wherein the fifth passage is isolated from the fourth and sixth passages so that fuel and oxygen do not mix within the burner.

14. The method of claim 1 further comprising providing a furnace crown having at least one burner hole and sealing the burner provided in step (A) to the at least one burner hole.

15. The method of claim 1 wherein oxygen is provided to the burner's third entrance port in step (D).

16. A method for making a fused silica glass comprising:

(A) providing a burner for producing silica soot, said burner having a burner face and a tube-in-tube construction which defines a plurality of passages for carrying flows of source materials to the burner face, said burner comprising:

(a) a first entrance port which is connected to a first passage defined by the first tube, said first passage extending from the first entrance port towards the burner face;

(b) a second entrance port which is connected to a second passage defined by the first tube and by a second tube, said second passage extending from the second entrance port towards the burner face;

(c) a third entrance port which is connected to a third passage defined by the second tube and by a third tube, said third passage extending from the third entrance port towards the burner face;

(d) a fourth entrance port which is connected to a fourth passage defined by the third tube and by a fourth tube, said fourth passage extending from the fourth entrance port towards the burner face; and (e) a fifth entrance port which is connected to a fifth passage defined by the fourth tube and by a fifth tube, said fifth passage extending from the fifth entrance port towards the burner face;

(B) providing a silicon-containing source material in vapor form to the burner's first entrance port;

(C) providing oxygen or an inert gas to the burner's second entrance port;

(D) providing oxygen to the burner's third entrance port; passage being between two adjacent tubes which make contact with one another at a plurality of points at the location of said flats.

17. The burner of claim 16 wherein at least one of the tubes comprises flats for reducing a transverse cross-sectional area of a passage.

18. The burner of claim 16 wherein the first tube extends beyond the face of the burner.

19. The burner of claim 18 wherein the flows of source materials carried by the second, third, fourth, and fifth passages are angled towards the first tube at the burner face.

20. The burner of claim 16 wherein the fifth tube has an outer surface which comprises an angled portion for sealing engagement with a burner hole formed in a crown of a furnace.

21. The burner of claim 16 wherein the fifth tube has an outer surface and the burner further comprises an air cooled jacket which surrounds at least a portion of said outer surface.

22. The burner of claim 16 wherein the fourth passage is isolated from the third and fifth passages so that fuel and oxygen do not mix within the burner.

23. A method of making a fused silica glass comprising:

(a) providing a furnace crown having at least one burner hole;

(b) providing a burner according to claim 16;

(c) sealing the burner to the at least one burner hole;

(d) providing a silicon-containing source material in vapor form to the burner's first entrance port;

(e) providing oxygen or an inert gas to the burner's second entrance port;

(f) providing oxygen to the burner's third entrance port;

(g) providing fuel to the burner's fourth entrance port; and (h) providing oxygen to the burner's fifth entrance port.

24. A burner comprising a plurality of concentric tubes, said tubes defining a plurality of passages, at least one of said tubes comprising flats for reducing a cross-sectional area of a passage, said passage being between two adjacent tubes.

25. A method for making a fused silica glass comprising:
(A) providing a burner comprising (i) an entrance port for providing a liquid source material to the burner and (ii) a plurality of concentric tubes, said tubes defining a plurality of passages, said plurality of passages comprising first and second passages, wherein:
  (1) the second passage is outboard of the first passage,
  (2) the second passage comprises a restriction zone for atomizing a liquid source material flowing in said second passage and through said restriction zone, and
  (3) said entrance port is connected to said second passage; and
(B) providing a liquid source material to said entrance port.

26. The method of claim 25 wherein the restriction zone comprises flats on at least one of the tubes which defines said at least one passage.

27. The method of claim 25 wherein the restriction zone comprises an annulus of reduced cross-sectional area produced by a taper on at least one of the tubes which defines said at least one passage.

28. The method of claim 25 wherein said passage has a transverse cross-sectional area which increases both in a direction upstream from the restriction zone and in a direction downstream from the restriction zone.

29. The method of claim 28 wherein at least one of said tubes comprises a taper which produces said increases in transverse cross-sectional area.

30. The method of claim 25 wherein said at least one passage merges with another passage downstream of said restriction zone to form a merged passage.

31. The method of claim 30 wherein said burner further comprises a restriction rod which reduces at least one transverse cross-sectional area of said merged passage.

32. The method of claim 25 wherein said burner has a burner face, one of the tubes extends beyond the face of the burner, and at least some of the remaining tubes are angled towards said one tube at the burner face.

33. A furnace for producing fused silica comprising a crown and a plurality of soot producing burners wherein the soot producing burners are sealed to the crown so as to substantially completely eliminate inspiration of air into the furnace at the locations of the burners.

* * * * *